US005604663A

United States Patent [19]
Shin et al.

[11] Patent Number: 5,604,663
[45] Date of Patent: Feb. 18, 1997

[54] PORTABLE COMPUTER DOCKING STATION HAVING A ROTATABLE MEMBER AND AUDIO SPEAKERS MOUNTED ON THE ROTATABLE MEMBER

[75] Inventors: Seong S. Shin, Cupertino; Young S. Kim, Los Altos, both of Calif.

[73] Assignee: Daewoo Telecom Ltd., Inchon, Rep. of Korea

[21] Appl. No.: 364,573

[22] Filed: Dec. 27, 1994

[51] Int. Cl.⁶ .............................. G06F 1/16; H05K 5/00
[52] U.S. Cl. ...................... 361/686; 361/683; 364/708.1
[58] Field of Search ........................... 361/683, 724–726; 455/346; 381/88; 364/708.1; 14/107; 18/1

[56] References Cited

U.S. PATENT DOCUMENTS 5,107,401  4/1992  Youn ...................................... 361/683
5,126,954  6/1992  Morita .................................... 361/683
5,483,419  1/1996  Kaczeus, Sr. et al. ................. 361/685

Primary Examiner—Michael W. Phillips
Assistant Examiner—Jayprakash N. Gandhi
Attorney, Agent, or Firm—Hopkins & Carley

[57] ABSTRACT

Disclosed herein is a portable computer docking station having a base with an electrical connector and a rotatable member. The base houses various electrical devices such as a battery power supply and memory storage devices. The rotatable member folds between a first extended position and a second extended position about an axis parallel to the base, for respectively receiving and locking the base with a portable computer. When the base locks with the portable computer, the electrical connector of the base connects with the portable computer for interconnecting the electrical devices housed in the base with the portable computer. The rotatable member includes a pair of audio speakers.

20 Claims, 3 Drawing Sheets

PORTABLE COMPUTER DOCKING STATION HAVING A ROTATABLE MEMBER AND AUDIO SPEAKERS MOUNTED ON THE ROTATABLE MEMBER

BACKGROUND OF THE INVENTION

1. Field of the Invention

This invention relates to computer stands which attach to support portable computers. More particularly, this invention relates to portable computer docking stations having user interactive features.

2. Previous Art

For years computers have relied upon various modes of communication to convey messages to a user. These modes include audio sounds generated by a speaker and video images displayed on a screen for example. The use of more than one mode of communication is termed "multimedia". The sophistication and resolution of multimedia communications has increased rapidly. Presently, sophisticated images displayed on a computer screen can include animation, graphics and video such as seen on a television. Currently, sound generated by a personal computer may have better quality than the sound of home audio systems of the past, even as recently as a few years ago.

With multimedia software and appropriate hardware, real time video images can be digitally stored, communicated and displayed. These video images can be displayed in conjunction with graphics, text and audio sound. For example, a video camera can be interconnected to store, enhance and display images on a computer. These video images can be stored digitally. Sound can also be digitally stored, enhanced and replayed with a computer.

Portable computers, can be configured to employ specialized circuitry such as a sound circuit, a video circuit, enhanced RAM and high resolution displays in order to run software having sophisticated multimedia capability. These computers have sufficient processing capability and memory capacity to store and accurately reproduce digitized video images. Typically, a 66 megahertz 486 type processor is able to facilitate the display of real time video images on a SVGA or VGA screen.

Most audio speakers which are integrated with portable computers sold today do not produce high quality, stereo sound. To produce such sound, the portable computer can be wired into a sound system. Most sound systems, however, are not portable. What is needed is a sound system which can be easily transported with a compatible portable computer to facilitate multimedia applications.

Multimedia images and accompanying sounds often require significant amounts of memory storage capacity. Replaceable memory modules which insert into the portable computer may not provide adequate memory capacity or permit adequate speed of data recall and storage to facilitate sophisticated multimedia applications. What is needed is a way to provide increased memory storage and recall capability to portable computers.

Portable computers require a portable power source such as a battery. Those portable computers having enhanced memory and considerable processing speeds generally require more energy to operate than computers of lesser memory and speed. Portable computers which run multimedia and other software often require features such as associated memory storage modules, specialized circuitry, a modem, a sound system and a secondary power source, for example. What is needed is a compact and portable way of providing the multiple features required by portable computers involved with multimedia applications. This should permit the addition of features not yet developed or newly desired features in view of continual changes seen in modern day computing.

SUMMARY AND OBJECTS OF THE INVENTION

It is an object of the invention to provide a portable computer docking station having sound and video capability which is configured to secure a portable computer.

It is a further object of the invention to provide a portable computer docking station which is compact and portable.

It is an object of this invention to provide a portable computer docking station which facilitates multimedia applications in conjunction with a portable computer.

In accordance with the above objects and those that have been mentioned and those that will be mentioned and will become apparent below, one preferred embodiment of the portable computer docking station comprises:

- a base for supporting a portable computer, the base having an electrical connector for connection with the portable computer; and
- a rotatable member rotatably mounted on the base, the rotatable member having a first extended position and a second locking position,
- whereby, when the base supports a portable computer the electrical connector connects with the portable computer and the rotatable member rotates from the first extended position to the second locking position to secure the portable computer with the base.

In a preferred embodiment, the rotatable member extends perpendicularly from the base when the rotatable member is in the second locking position.

In another preferred embodiment, the rotatable member includes a latch for locking the rotatable member to the base.

In another preferred embodiment, the base has a hinge block formed integral with the base, the rotatable member rotatably attaches to the hinge block.

In another preferred embodiment, the rotatable member has two ends with audio speakers attached to each end, the ends of the rotatable member rotatably attach to the base to facilitate production of stereo sound.

In another preferred embodiment, the base has a flat top, a pair of switches and a pair of latches, the switches attach to the latches and the latches extend from the flat top to hold a portable computer.

In another preferred embodiment, the base houses an electrical device. The electrical device is an optical disk drive.

In another preferred embodiment, the base includes PCM-CIA card slots, a DC connection part adapted to connect the base with A/C an adapter, a serial connection port, a VGA monitor connection port, a video, audio and MIDI connection ports and a parallel connection port and battery bay.

It is an advantage of the present invention to provide a portable computer docking station which is capable of being secured to a portable computer.

It is a further advantage of the present invention to provide a portable computer docking station which is compact and portable.

It is a further advantage of the present invention to provide a portable computer docking station which facilitates multimedia applications in conjunction with a portable computer.

BRIEF DESCRIPTION OF THE DRAWINGS

For a further understanding of the objects and advantages of the present invention, reference should be given to the following detailed description, taken in conjunction with the accompanying drawings, in which like parts are given like reference numerals and wherein.

DETAILED DESCRIPTION

Figure 1:
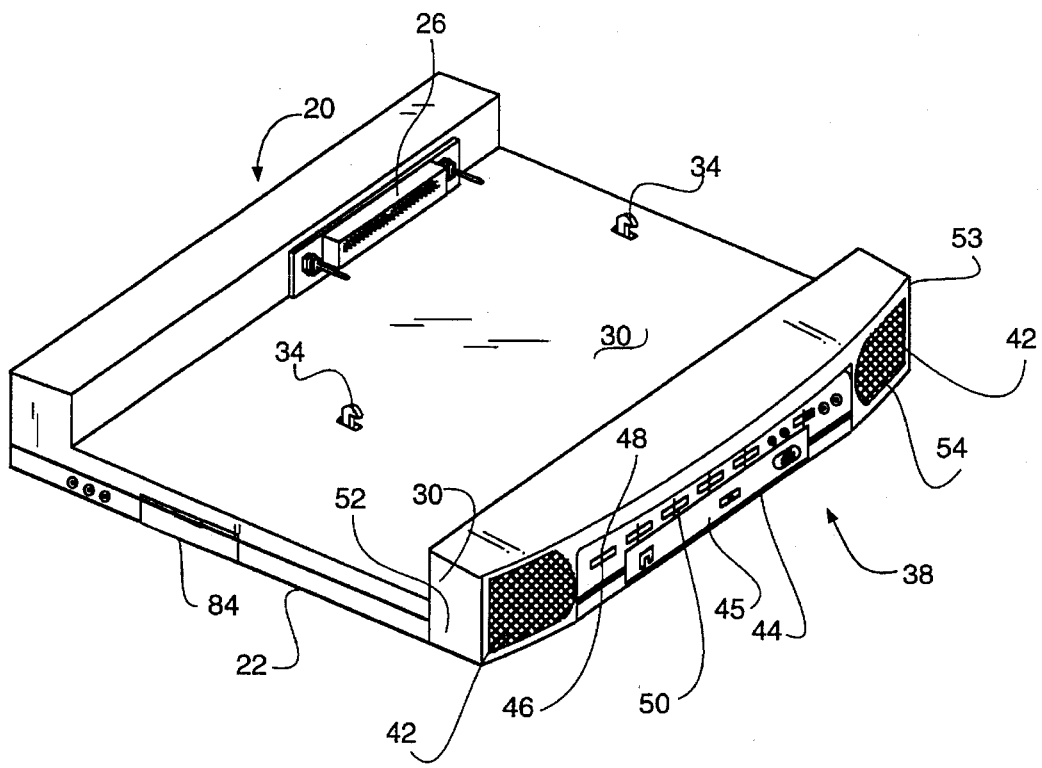
FIG. 1 is a perspective view of a portable computer docking station in accordance with the present invention.

With particular reference to FIG. 1, there is shown a portable computer docking station generally designated by the reference numeral 20. The portable computer docking station 20 includes a base 22, a rotatable member 24, and an electrical connector 26. The rotatable member 24 and the electrical connector 26 attach to the base 22. The base 22 is configured to support a portable computer. The electrical connector 26 is configured for electronically connecting to a portable computer. The term "portable computer" is defined herein as any portable computer, having processing, memory and a display capabilities which is hand carryable by an operator. Portable computers include "notebook", "notepad" and "laptop" computers.

The rotatable member 24 rotatably attaches to the base. The rotatable member 24 includes a rear face 30. The rear face 30 is flat for urging against a portable computer. The rotatable member 24 is in a locking position with respect to the base 22. In the locking position, the rotatable member 24 extends perpendicularly from the base 22.

The rear face 30 is flat to conform to the shape of and hold a portable computer. Although, the rotatable member 24 has a flat rear face 30 which extends perpendicularly from the flat top 32 in the locked position, the rotatable member 24 can be adapted in a variety of shapes and extend in various other angles to hold a portable computer.

The base 22 has a switch (not shown), a pair of latches 34 and a flat top 32. The flat top 32 is generally rectangular for supporting a portable computer. The latches 34 extend from the flat top 32 for securing a portable computer to the flat top 32. The latches 34 move independently for connection with latch holes (not shown) of a portable computer.

The switch attaches to the base 22 for selectively actuating each latch 34. The switch is manually operable to actuate the latch 34 and thereby attach or remove a portable computer from the base 22. The latches 34 are spring biased and respond to actuation by a respective switch. The latches 34 move in response to placement of a portable computer on the flat top 32 of the base 22 to hook the portable computer.

The base 22 has a front face 36 and electronic controls generally indicated by the reference numeral 38. The rotatable member 24 has audio speakers 42. The front face 36 supports the electronic controls 38 between the speakers 42.

The electronic controls can be adapted to perform a variety of functions. In one embodiment, the electronic controls 38 are manually operable and electronically connect with the audio speakers 42 to regulate the operation of the audio speakers 42. The electronic controls 38 include volume 46, balance 48 and mixer 50 controls. Other controls such as bass, treble can and are supported within the front face within the spirit and scope of this invention.

The audio speakers 42 are adequately distanced from each other to permit a nearby listener (e.g. several feet away) to hear output from the speakers 42 in stereo. In one embodiment the audio speakers 42 attach at each end 52 of the rotatable member 24. A protective cover 54 mounts over and protects each speaker 42 from puncture and other damage.

An optical disk drive 45 having a cover 44 mounts on the front face 36 adjacent the rotatable member 24. The cover 44 opens for receiving a memory storage device e.g. an optical disk. The optical disk drive 45 is operably connected within the base 22, behind the cover. The optical disk drive 45 is electronically connected with the electrical connector 26 for communicating digital information with a portable computer.

The electronic controls 38 regulate operation of the optical disk drive 45. It can be appreciated that the electronic controls 38 can occupy alternate locations on the portable computer docking station 20. For example, the electronic controls 38 can attach anywhere along the rotatable member 24. Although an optical disk drive 38 is disclosed, it can be appreciated that other electrical devices including memory storage devices and electronic circuitry can be housed in the base 22.

Figure 2:
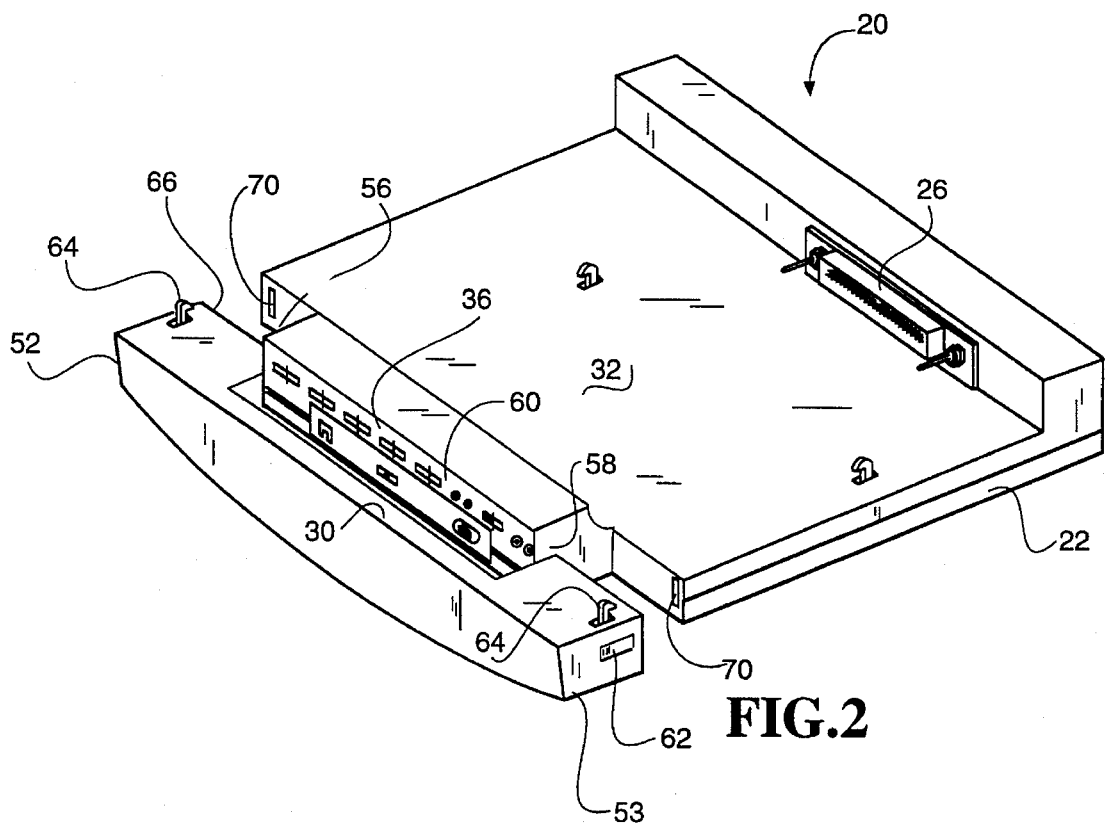
FIG. 2 is a perspective view of the portable computer docking station of FIG. 1 with the rotatable member folded.

With particular reference to FIG. 2, there is shown a portable computer docking station 20. The rotatable member 24 occupies an extended position. In the extended position, the rear face 30 of the rotatable member 24 lies coplanar with the flat top 32 of the base 22. The base 22 includes a hinge block 56 formed integral with the base 22 to permit rotation of the rotatable member from the locking position (FIG. 1 ) to the extended position (FIG. 2).

The hinge block 56 extends from the base 22. The hinge block 56 has a rectangular block shape with two opposing ends 58. The rotatable member 24 rotatably attaches to the opposing ends 58 of the hinge block 56.

The rotatable member 24 has two ends 52 and 53. The speaker 42 (FIG. 1 ), a switch 62, a latch 64 each attach on each of the ends. The latch 64 mounts on the rear face 30 and mechanically connects with the switch 62. The base 22 defines a pair of latch holes 70 for receiving each respective rotatable member latch 64. The latch 64 is automatically attachable to the latch holes 70 of the base 22 when the rotatable member 24 rotates into the locked position (FIG. 1 ). The switch 62 selectively releases the latch 64 from the base 22 to permit the rotatable member 24 to fold from the locked position (FIG. 1 ) to the extended position.

Figure 3:
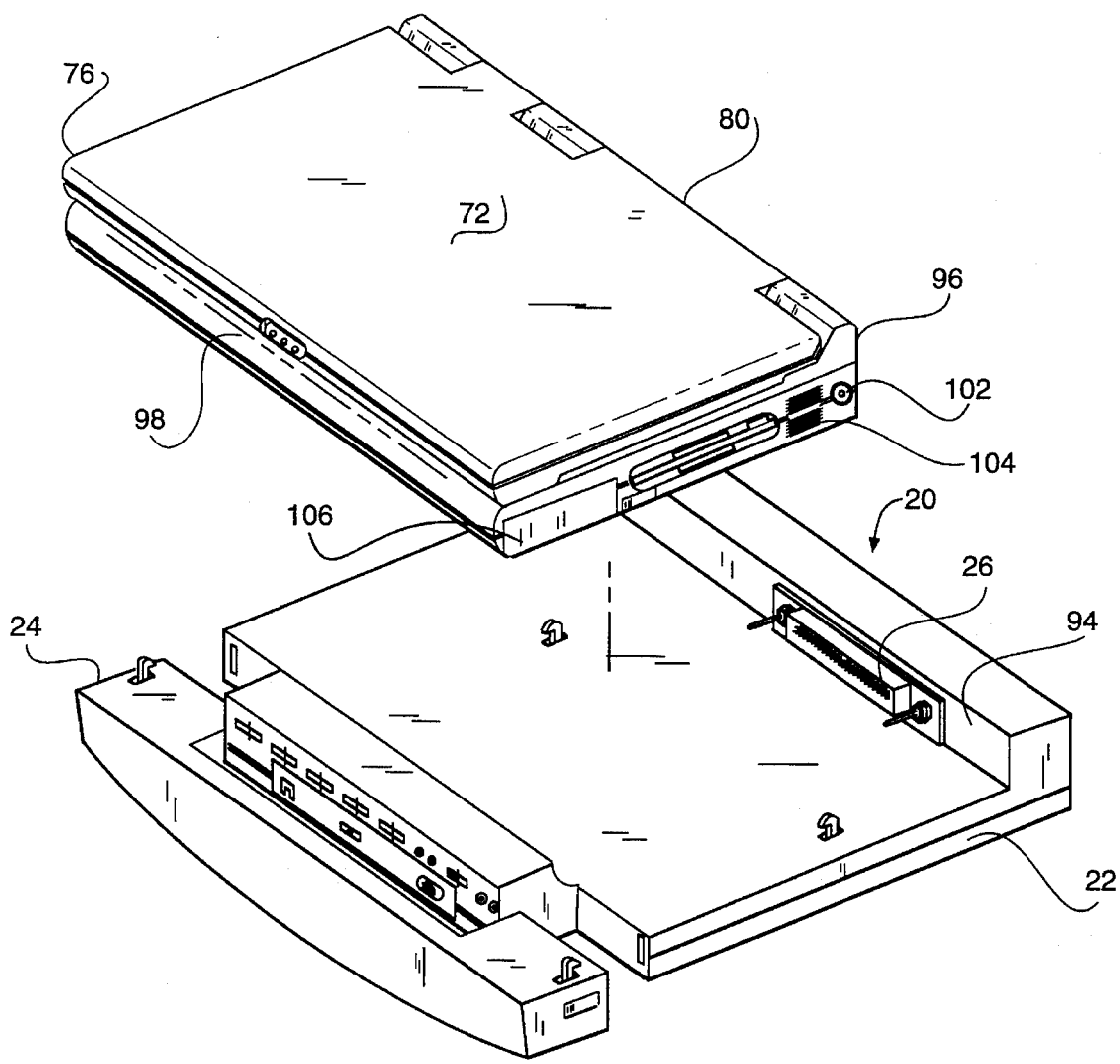
FIG. 3 is an exploded perspective view of the portable computer docking station of FIG. 2 with a portable computer.

With particular reference to FIG. 3, there is shown a portable computer 72 ready to mate with the portable computer docking station 20. The portable computer 72 has a folding display 76 which folds securely on the portable computer 72.

The rotatable member 24 of the portable computer docking station 20 is in the extended position for receiving the portable computer 72. An electrical connector 80 on the portable computer 72 aligns to electronically connect with the electrical connector 26 of the base 22. More particularly, the rotatable member 24, folds from the extended position to the locking position and thereby urges against the portable computer 72 to urge the portable computer along the flat top 32 to against the base 22. It can be appreciated that electrical connection between the portable computer 72 and the base is facilitated via the electrical connectors 80 and 26 respectively, that alternate types of electrical connectors can be used such as those connectors having several plugs.

The portable computer 72 has a rear portion 96 and a front portion 98. The portable computer docking station 22 has a rear portion 94. The rotatable member 24 with the speakers 42 rotate to urge against the front portion 98 of the portable computer 72 to align the portable computer 72 with base. Rotation of the rotatable member 24 causes the rear portion 30 of the rotatable member 24 to urge the rear portion 96 of the portable computer 72 into alignment with the rear portion 94 of the base 22. Accordingly, the electrical connector 80 aligns with the electrical connector 26 of the portable computer 72. The rear portion 96 of the portable computer 72 is adapted to tightly fit against the rear portion 94 to align the electrical connectors 80 and 26 when the portable computer 72 operably attaches to the portable computer docking station 20.

The rotatable member 24 rotates from the extended position and urges the rear face 30 against the portable computer 76. In response to rotation of the rotatable member 24, the portable computer 72 slides on the top face 32, and engages the latches 34. Simultaneous with engagement of the portable computer 72 with the latches 34, the electrical connector 26 connects with the electrical connector 80 of the portable computer docking station 20.

Also shown in FIG. 3 are the connections for the TV outlet 102, vents 104 and a battery door 106. As will be appreciated, the TV output connector 102 allows the portable computer 72 to meet with a TV screen for viewing and communication therewith. The vent 104 allows exhaustion of heat to keep the portable computer 72 at a nominal operating temperature. The battery door 106 allows an appropriate battery pack to be inserted in the portable computer 72 for operation of same.

Figure 4:
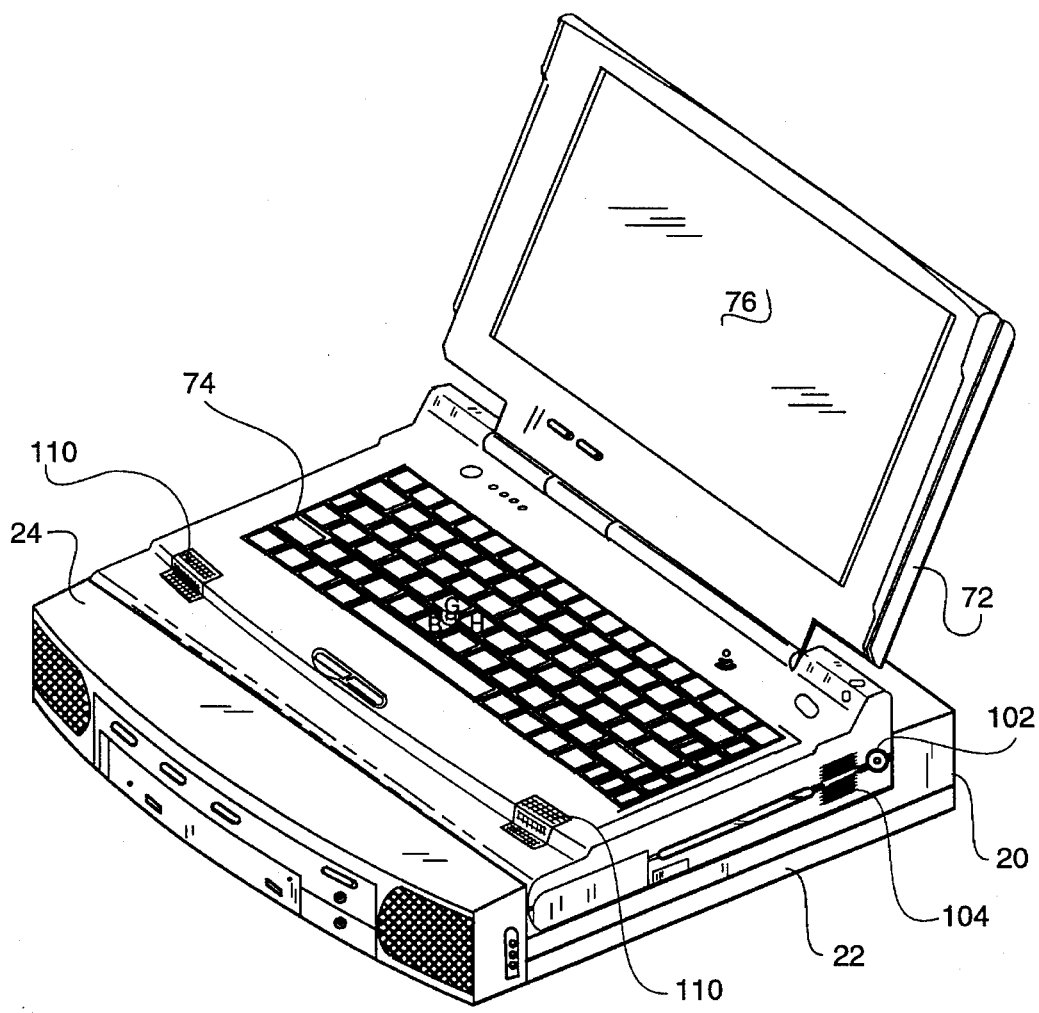
FIG. 4 is a perspective view of the portable computer docking station of FIG. 1 supporting a portable computer.

With particular reference to FIG. 4, there is shown the portable computer 72 operably attached to the portable computer docking station 20. The portable computer 72 includes a keyboard 74, and the folding display 76. The folding display 76 is opened and visible.

The rotatable member 24 occupies the locking position and holds the portable computer 72 on the base 22. The rotatable member 24 supports the hands of a keyboard user during keyboard operation.

The base 22 includes a PCMCIA card port 84 for receiving Type II and Type III PCMCIA cards. It can be appreciated that various other memory storage ports can be provided in the base 22 such as those configured for Type IV PCMCIA cards, floppy disks and other memory storage devices. "PCMCIA" as defined herein includes removable memory storage devices which are sized having a surface area approximately corresponding with and a thickness slightly larger than a typical credit card.

As shown in FIG. 4, the portable computer 72, also includes speakers 110 for allowing a true multimedia experience with the portable computer 72 by itself.

Figure 5:
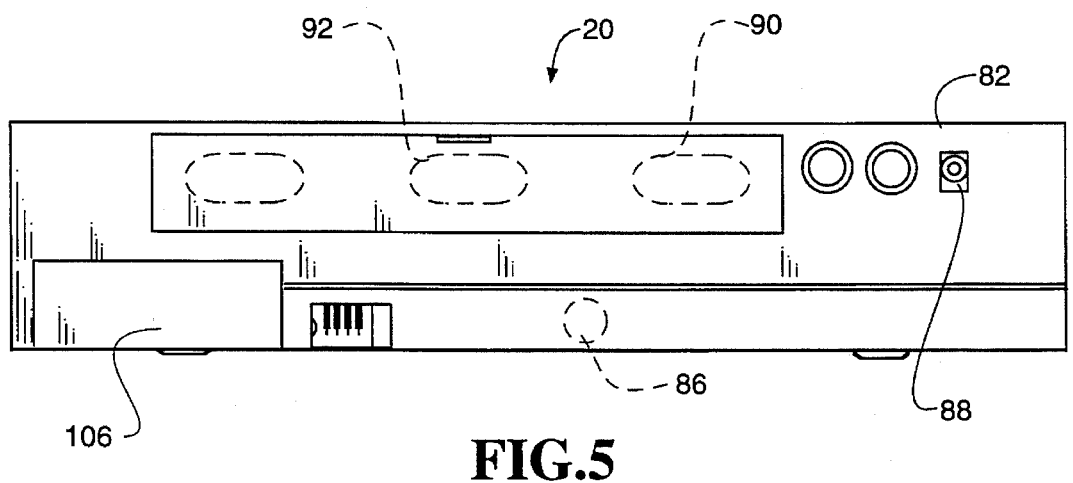
FIG. 5 is a side view of the rear of the portable computer docking station.

With particular reference to FIG. 5, there is shown the portable computer docking station 20 as seen from a rear 82 side which opposes rotatable member 24 (FIG. 2). In one embodiment, the rear 82 is configured with various electrical ports and connectors to duplicate various electrical ports and connectors associated with portable computers.

In the embodiment shown, a television input port 86 attaches to the rear 82 for connecting a television to the portable computer 72 via the base 22 to facilitate communication of images from the portable computer 72 to a television and vice versa.

A DC input connector 88 attaches to the rear 82 of the base 22 for connecting an A/C adapter to operate the portable computer 72 and electrical devices associated with the base 22 e.g. the speakers 42 (FIG. 1). The A/C adapter connector 88 facilitates recharging of batteries (not shown) included with either the base 22 or the portable computer 72.

A serial port 90 and a parallel port 92 attach to the rear 82 of the base 22 for connecting the base 22 with computer peripheral devices e.g. a printer and other computers e.g. such as a computer network. Although various ports having a variety of functions are disclosed, the base 22 is capable of having other ports and housing various electrical devices including, but not limited to, a modem, network cards, a video and logic circuitry, audio circuitry, microprocessors, memory devices, input circuitry, and output circuitry. These various electrical devices being electronically connectable with the portable computer 72 via the electrical connector 26 to facilitate communication with the portable computer 72.

While the foregoing detailed description has described several embodiments of the portable computer docking station in accordance with this invention, it is to be understood that the above description is illustrative only and not limiting of the disclosed invention. Particularly, the various devices attachable with the rotatable member 24 can be any of a myriad of devices, including input devices, displays, output devices, controls, etc. Also, the devices housed in the base 22 can be any of a myriad of electrical device types which are compatible for use, or capable of communication with, with a portable computer 72. For example, the electrical devices housed in the base 22 can include Type II PCMCIA card circuitry, Type III PCMCIA card circuitry, video module board, television input and output ports, an audio control board, a battery power source, serial and parallel port circuitry and an DC/DC converter. Furthermore, the geometry and hinged attachment of the rotatable member 24 with the base 22 can include any capable of selectively holding a portable computer 72 with the base 22. For example, the rotatable member 24 may be configured to perform additional functions and align the portable computer 72 with the electrical connector 26.

We claim:

1. A portable computer docking station comprising:

a base for supporting a portable computer, the base having an electrical connector for connection with the portable computer; and a rotatable member rotatably attached to the base, the rotatable member having an extended position and a locking position, and being rotatable between the two positions about an axis parallel to the base, the extended position being adapted for permitting the base to receive the portable computer, and the locking position being adapted for locking the portable computer to the base.

2. A device as set forth in claim 1, wherein the rotatable member extends perpendicularly from the base when the rotatable member is in the locking position.

3. A device as set forth in claim 2, wherein the rotatable member includes a latch for locking the rotatable member to the base.

4. A device as set forth in claim 1, wherein the base has a hinge block formed integral with the base, the rotatable member rotatably attaches to the hinge block.

5. A device as set forth in claim 1, wherein the rotatable member has two ends with audio speakers attached to each end, the ends of the rotatable member rotatably attach to the base to facilitate production of stereo sound.

6. A device as set forth in claim 1, wherein the base has a flat top, a pair of switches and a pair of latches, the switches attach to the latches and the latches extend from the flat top to hold a portable computer.

7. A device as set forth in claim 1, wherein the base houses an electrical device.

8. A device as set forth in claim 7, wherein the electrical device is an optical disk drive.

9. A portable computer docking station comprising:

a base for supporting a portable computer, the base having an electrical connector for connection with the portable computer;

a rotatable member rotatably attached to the base, the rotatable member having a first extended position and a second locking position; and an audio speaker mounted on the rotatable member, whereby, when the base supports a portable computer the electrical connector connects with the portable computer and the rotatable member rotates from the first extended position to the second locking position to secure the portable computer with the base.

10. A device as set forth in claim 9, wherein the base includes an optical disk drive.

11. A device as set forth in claim 10, wherein the base defines a slot for receiving PCMCIA cards.

12. A device as set forth in claim 9, wherein the base includes an A/C adapter connector for providing power to the portable computer and to the base.

13. A device as set forth in claim 9, wherein the base includes a serial connection port and a parallel connection port for interconnecting the base with computer peripheral devices.

14. A portable computer docking station comprising:

a base for supporting a portable computer, the base having an electrical connector for connection with the portable computer and a hinge block;

a rotatable member rotatably attached to the hinge block, the rotatable member having a first extended position and a second locking position;

audio speakers mounted on the rotatable member, the speakers being electronically attached to the electrical connector to respond to signals generated by the portable computer; and electronic controls mounted on the base for regulating operation of the audio speakers, whereby, when the base supports a portable computer the electrical connector connects with the portable computer and the rotatable member rotates from the first extended position to the second locking position to secure the portable computer with the base.

15. A device as set forth in claim 14, wherein the base includes a latch, the latch being automatically attachable to the rotatable member when the rotatable member is in the locked position to lock the portable computer with the base when the portable computer is secured on the base.

16. A device as set forth in claim 15, wherein the latch includes a manually operable switch for selectively engaging and disengaging the latch from the rotatable member and selectively locking the rotatable member in the second locking position.

17. A device as set forth in claim 14, wherein the hinge block has two opposing ends, the rotatable member has two ends, the ends of the rotatable member rotatably attach to the opposing ends of the hinge block.

18. A device as set forth in claim 14, wherein the base has a front face, controls are mounted on the front face.

19. A device as set forth in claim 17, wherein the audio speakers are mounted on the ends of the rotatable member.

20. A device as set forth in claim 14, wherein the base includes a means for holding the rotatable member in the locked position.

\* \* \* \* \*